United States Patent Office 3,567,496
Patented Mar. 2, 1971

---

3,567,496
METHOD OF PRODUCING PLASTIC IMPREGNATED CONCRETE
Meyer Steinberg, Huntington Station, Peter Colombo, Patchogue, Lawrence E. Kukacka, Port Jefferson, and Bernard Manowitz, Brightwaters, N.Y., assignors to the United States of America as represented by the United States Atomic Energy Commission
No Drawing. Filed Aug. 9, 1968, Ser. No. 751,338
Int. Cl. C04b *41/28;* C05c *3/02*
U.S. Cl. 117—113                                                       4 Claims

ABSTRACT OF THE DISCLOSURE

A method of improving the physical properties of concrete bodies comprising impregnating the body with a mixture of monomer and polymerization catalyst and thereafter thermo-catalytically polymerizing the monomer in situ.

BACKGROUND OF THE INVENTION

Copending U.S. patent application S.N. 623,179, "Polymer Impregnated Concrete," filed Mar. 9, 1967, now abandoned, M. Steinberg, B. Manowitz, L. E. Kukacka and P. Colombo discloses a process for increasing the compressive strength and decreasing the permeability of concrete wherein a preformed concrete body is impregnated with a monomer and thereafter subjecting the monomer impregnated concrete body to ionizing radiation to polymerize said monomer in situ. The process disclosed in that application is limited to those situations where ionizing radiation can be conveniently employed.

Since it is desirable in many instances to form concrete bodies having increased compressive strength and decreased permeability which are of a size and shape wherein ionizing radiation cannot be conveniently or economically employed, the art has sought chemical methods of producing plastic impregnated concrete.

SUMMARY OF THE INVENTION

The invention described herein was made in the course of, or under a contract with the United States Atomic Energy Commission.

In this invention preformed solid concrete bodies are given decreased permeability and increased compressive strength by impregnating a preformed concrete body with from about 1.0 weight percent to about 30 weight percent based on the weight of the concrete, of a monomer selected from the group consisting of styrene, acrylonitrile, methyl methacrylate, isobornyl methacrylate, and trimethylolpropane trimethacrylate; and from about 0.1 weight percent to about 5 weight percent based on the weight of the monomer of a peroxide polymerization catalyst and thereafter maintaining the impregnated concrete body at a temperature ranging from about 50° C. to about 85° C. until said monomer has polymerized in situ.

DETAILED DESCRIPTION OF THE INVENTION

By the term preformed solid concrete body we mean solid bodies formed of any of the various artificial building materials currently commercially available, made by mixing cement and sand with gravel, broken stone, or other aggregate substances and sufficient water to cause the cement to set and bind the entire mass.

Conventional free radical peroxide polymerization catalysts can be used in the practice of the invention such as benzoyl peroxide, methyl ethyl ketone peroxide, cyclohexononeperoxide, tertiary butyl peroxide etc. The catalyst can be dispersed in a compatible solvent when desirable. In the preferred embodiment of our invention we employ about 1 weight percent of benzoyl peroxide based on the weight of monomer employed.

The concrete should be substantially dry before it is impregnated with the monomer and in most cases it is recommended that the concrete body be placed under a vacuum of 3 inches of mercury for one hour to ensure dryness.

The impregnation of the concrete body with both the monomer and catalyst can be performed in the same operation. However, we have found it advantageous to first impregnate the body with monomer and thereafter to impregnate it with catalysts when thick concrete bodies are used to ensure complete dispersion of the monomer throughout the body prior to the onset of polymerization. The impregnation should be carried out at temperatures below 30° C. to prevent premature polymerization of the monomer.

The length of heating time and temperature employed will of course be related to the type and amount of monomer and catalyst employed as well as the degree of polymerization desired.

The monomers found usable in our invention are commercially available. In the preferred embodiment of our invention we use isobornylmethacrylate as the monomer and benzoyl peroxide as the catalyst.

The concrete body can be impregnated with the monomer by immersing the body in the monomer. Pressure can be use to increase the rate of impregnation.

Dyes can be added to the monomer which are compatible with the system to produce concrete having enhanced color properties.

Solvents can be employed to enhance the degree of impregnation of the monomer and/or catalyst into the concrete body.

Various methods of varying the degree of penetration and impregnation of the monomer and catalyst into the concrete can be advantageously employed in the practice of our invention, e.g., preevacuation, pressurization soaking, gas phase saturation, etc.

EXAMPLE

Samples of concrete 2 x 1 x 0.5 inches were soaked in various monomer-catalyst mixtures (99.0 weight percent monomer 1.0 weight percent catalyst) for 1.0 hour at room temperature. After soaking, the samples were removed from the liquid and placed into glass vials. The vials were then heated in constant temperature baths at 80° C. for 2.5 hours.

The following chart shows the results obtained for various monomer catalyst mixtures tested.

| Sample number monomer | Catalyst | Percent weight [1] | Compressive strength, p.s.i. | Tensile strength, p.s.i. | Modules of elasticity, $10^6$ p.s.i. | Percent weight [2] |
|---|---|---|---|---|---|---|
| I. Styrene | Benzoyl peroxide | 5.1 | 9,986 | 840 | 7.39 | 0.36 |
| II. Methyl methacrylate | do | 6.6 | 18,161 | 1,508 | 6.21 | 0.38 |
| III. Acrylonitrile | do | 5.4 | 18,630 | 1,040 | 6.30 | 0.47 |
| IV. Isobornyl methacrylate | do | 6.1 | 19,205 | 1,578 | 6.47 | 0.31 |
| V. Trimethylolpropane trimethacrylate | do | 6.2 | 19,474 | 1,645 | 6.64 | 0.26 |
| VI. Untreated Control | | | 5,270 | 416 | 3 | 2.70 |

[1] Increase over original concrete weight.
[2] Increase after soaking 96 hours in $H_2O$.

From the results obtained in the example, it will be obvious to these skilled in the art that our novel polymer impregnated concrete with its greatly increased compressive and tensile strength and decreased water permeability actually provides a new basic material of construction having widespread usages e.g., concrete pressure and sewage pipe; columns and wall panels in housing; underwater pilings, instrumented buoys, pressure vessels and boat hulls.

What is claimed is:

1. A method of producing concrete bodies having increased compressive and tensile strengths and decreased water permeability comprising impregnating a preformed concrete body by completely dispersing therein from 1.0 weight percent to about 30 weight percent based on the weight of the concrete body; of a liquid monomer selected from the group consisting of styrene, acrylonitrile, methyl methacrylate, isobornyl methacrylate, and trimethylolpropane trimethacrylate; and from about 0.1 weight percent to 5.0 weight percent based on the weight of the monomer employed of a peroxide polymerizing catalyst said impregnating step being performed at a temperature not greater than approximately 30° C. to prevent premature polymerization of the monomer, and thereafter maintaining the impregnated concrete body at a temperature ranging from about 50° C. to about 85° C. until said monomer has polymerized in situ.

2. A method in accordance with claim 1 wherein said monomer is isobornyl methacrylate.

3. A process in accordance with claim 2 where the catalyst is benzoyl peroxide.

4. A process in accordance with claim 3 wherein the monomer is completely dispersed throughout the concrete body by immersing the body in a mixture of monomer and catalyst.

References Cited

UNITED STATES PATENTS 3,194,792   7/1965   Falgiatore et al. ____ 117—124E

ALFRED L. LEAVITT, Primary Examiner

E. G. WHITBY, Assistant Examiner

U.S. Cl. X.R.

117—123, 161; 52—309, 515